United States Patent [19]

Nielsen

[11] Patent Number: 5,114,330

[45] Date of Patent: May 19, 1992

[54] APPARATUS FOR MOLD MODULE CHANGE-OUT

[75] Inventor: Peter G. Nielsen, King, N.C.

[73] Assignee: AMP Incorporated, Harrisburg, Pa.

[21] Appl. No.: 627,094

[22] Filed: Dec. 13, 1990

[51] Int. Cl.$^5$ .............................................. B29C 33/00
[52] U.S. Cl. ................................... 425/193; 100/918; 425/195
[58] Field of Search ................ 425/182, 190, 192 R, 425/193, 195; 100/918; 164/339, 342; 72/446, 448; 29/568

[56] References Cited

U.S. PATENT DOCUMENTS

| | | | |
|---|---|---|---|
| 3,831,427 | 8/1974 | Lee | 100/918 |
| 4,402,657 | 9/1983 | Laghi | 425/190 |
| 4,473,346 | 9/1984 | Hehl | 425/190 |
| 4,529,371 | 7/1985 | Nickley | 425/190 |
| 4,666,387 | 5/1987 | Yokota et al. | 425/192 R |
| 4,702,685 | 10/1987 | Fruntzer | 425/190 |

FOREIGN PATENT DOCUMENTS 0158878  2/1983  German Democratic Rep. ................ 425/190

Primary Examiner—Jay H. Woo
Assistant Examiner—C. Scott Bushey
Attorney, Agent, or Firm—Allan B. Osborne

[57] ABSTRACT

Apparatus (30,42) for a molding press (10) which permits rapid mold module (50,52) change-out has been disclosed. The apparatus includes a sliding frame plate (30) which carries the B-side master frame (48) and plate receiving members (42) for receiving the plates (30). One member (42-b) is mounted on the movable platen (38) and another member (42-a) is located to one side and in alignment with the other so that the frame plate (30) may be shifted in and out of the press (10).

4 Claims, 4 Drawing Sheets

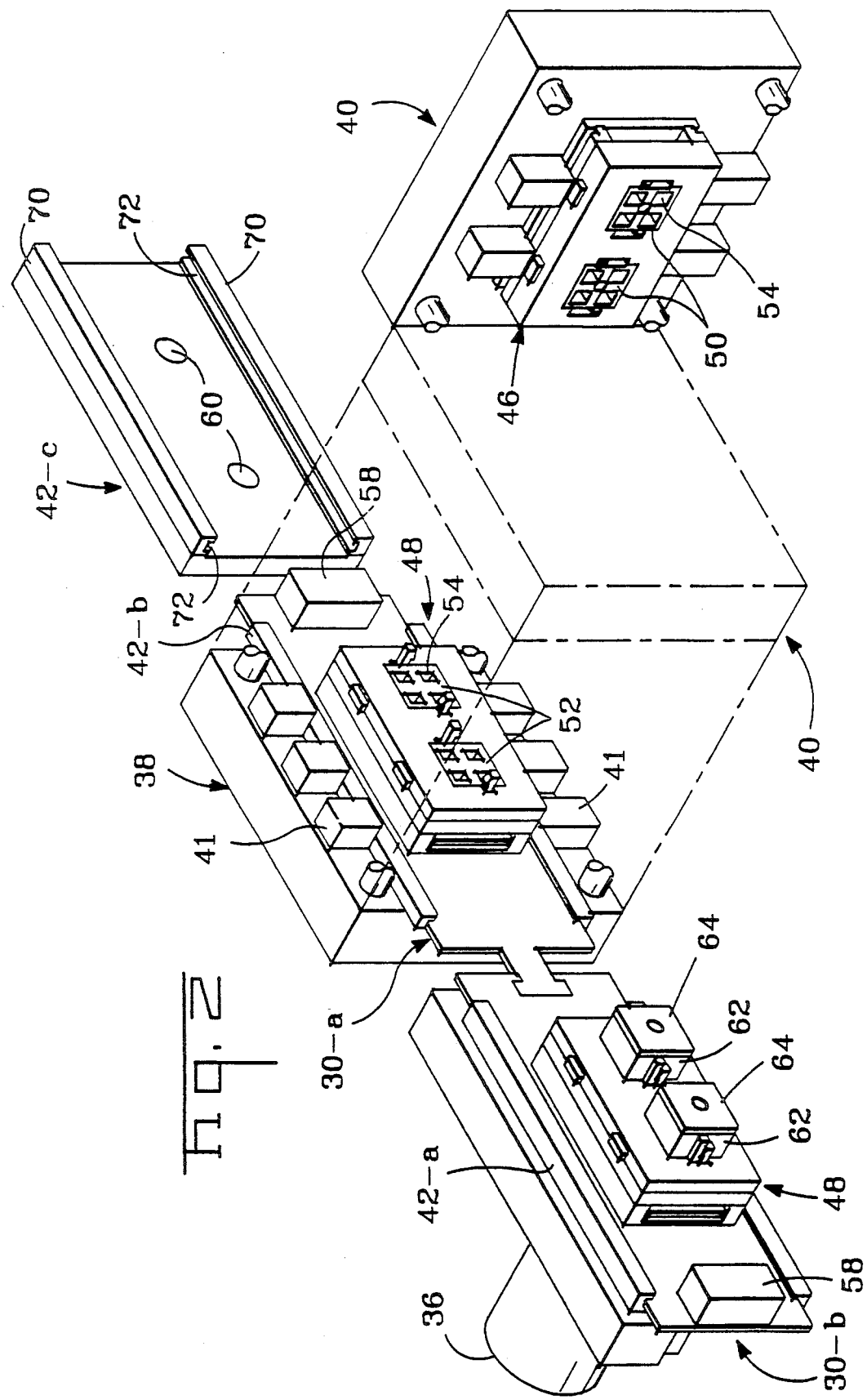

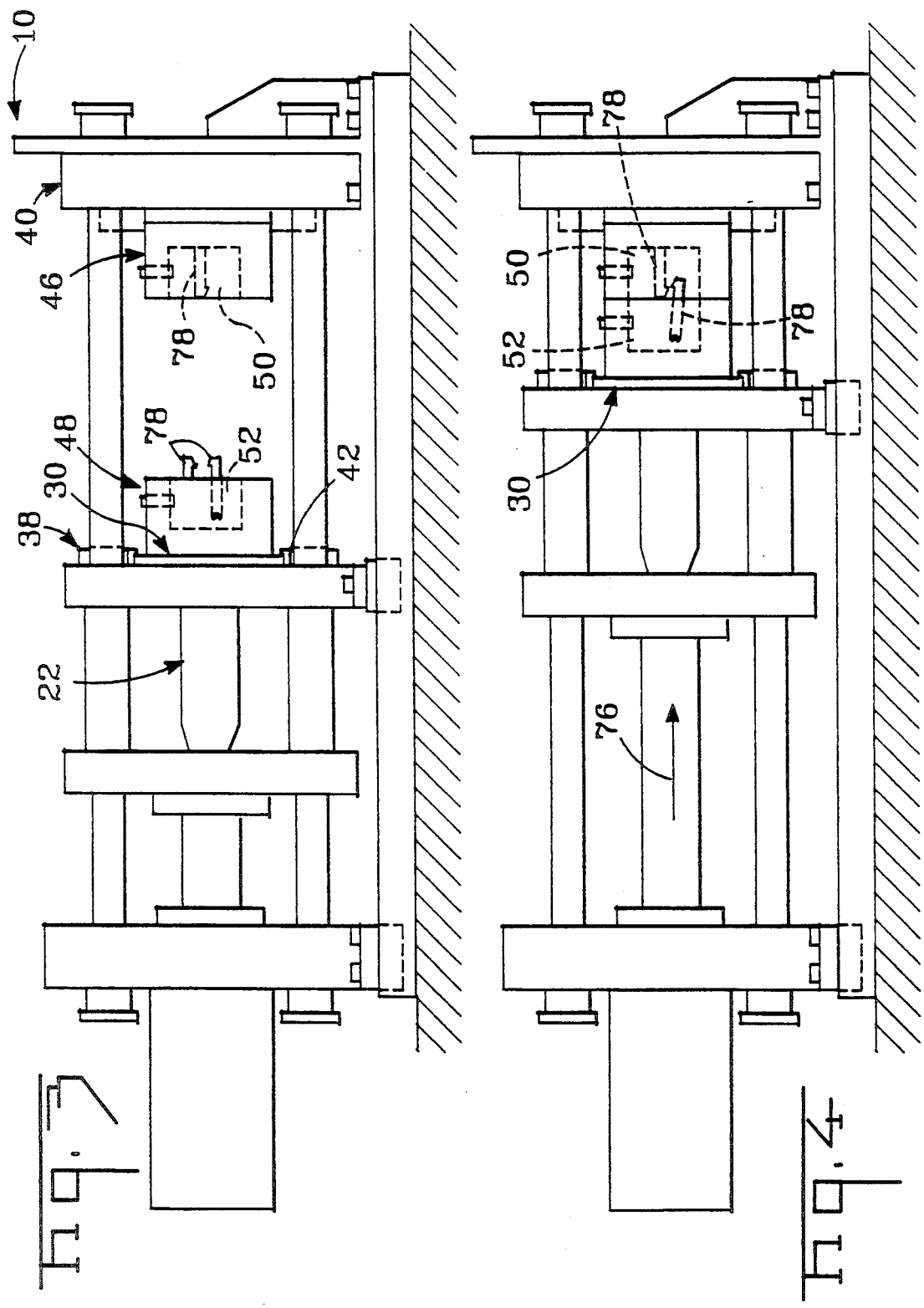

APPARATUS FOR MOLD MODULE CHANGE-OUT

FIELD OF THE INVENTION

The invention disclosed herein relates to apparatus for molding parts and to a method for quickly changing the mold modules.

BACKGROUND OF THE INVENTION

Contemporary mold change-out sequence begins with the press bringing the stationary and movable platens together, strapping the A and B mold halves together and disengaging the A mold half from the A side platen and the B mold half from the B side platen. A cable from a hoist is attached to the joined halves and, as the press is slowly opened, the weight of the joined halves is taken by the hoist. With the press fully opened, the hoist moves the joined halves to a location outside the press. A new set of A and B mold halves are attached to the hoist and placed in the press in the reversed order. Depending upon the accessibility, size and weight of the mold and other factors, a mold change-out can take from fifteen minutes up to several hours.

It is now proposed to provide a mold apparatus and method of change-out which will take only two normal cycles of the press.

SUMMARY OF THE INVENTION

According to the invention, apparatus is provided for a molding press so that mold modules may be quickly changed-out so as to decrease press out-of-service time. The apparatus includes, at a minimum, a first plate receiving member mounted on the movable platen of the press and a second plate receiving member mounted to one side and in alignment with the first member. Further included is a sliding frame plate which is mounted to be slid to and from the two plate receiving members and which carries the B-side master frame and one set of mold modules. The invention further discloses a method for changing the mold modules which requires sliding the sliding frame plate away from the plate receiving member on the movable platen and onto the second member after the mold modules in the A-side master frame have been latched onto the mold modules in the B-side master frame on the sliding frame plate.

BRIEF DESCRIPTION OF THE DRAWINGS

FIG. 2 is a perspective view of the mold apparatus of the present invention; and FIGS. 3-7 are diagrammatical side views showing the sequence of steps involved in changing the mold modules.

DESCRIPTION OF THE INVENTION

Figure 1:
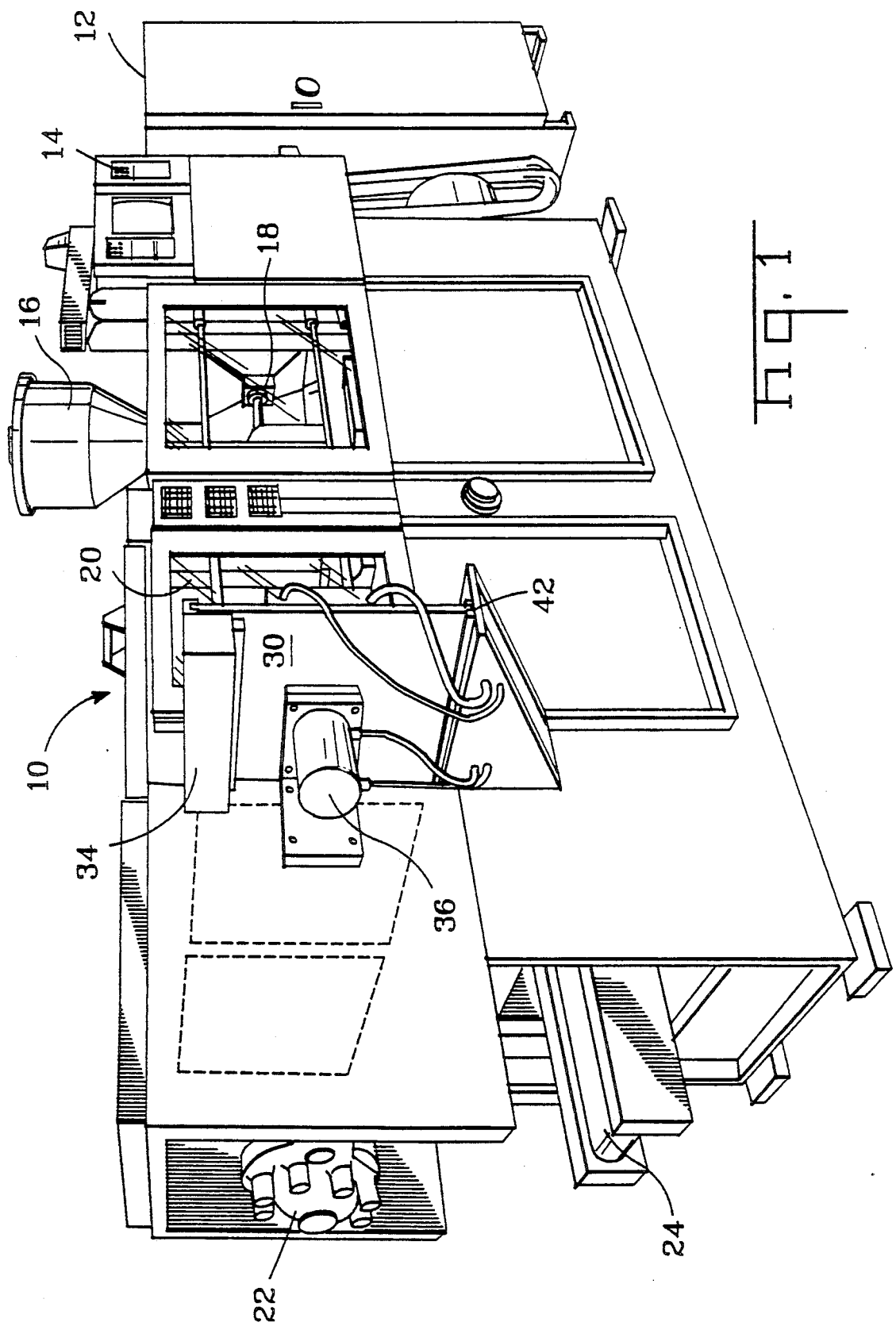
FIG. 1 is a perspective and diagrammatical view of a molding press utilizing the mold apparatus and method of the present invention.

Molding press 10 shown in FIG. 1 includes components typically found on contemporary presses. Some of these components are, from right to left, control panel 12, screen and keyboard unit 14, hopper 16, injector 18 and stationary platen 20. At the far left, an end of the movable platen actuating device 22 is shown. Obviously press 10 containing many more components which are not shown because they are not particularly necessary for a complete understanding of the present invention.

Components shown in FIG. 1 and which are part of the present invention include sliding frame plates 30, plate receiving member 42, plate actuating mechanism 34 and mold module ejector 36.

Plate actuating mechanism 34 includes any mechanism designed to move plates 30 such as servo-driven acme style lead screw drive, hydraulically activated mechanism and so forth. Mold module ejector 36 includes any mechanism designed to remove a module from a master frame such as a hydraulically activated knock out bar.

FIG. 2 shows attached sliding frame plates 30-a, 30-b, movable platen 38 to which plate 30-a is temporarily clamped and stationary platen 40.

Platen 38 is known in the industry as the ejector side or B-side. Platen 40 is known in the industry as the injection side or A-side. Further shown are plate receiving members 42, with members 42-a being to the left, member 42-b attached to platen 38 and member 42-c to the right. Reference numerals 41 indicate devices used to secure member 42-b to platen 38. Additionally, A-side master frame 46 is shown attached to stationary platen 40 (which has been rotated ninety degrees for illustrational purposes) and B-side master frame 48 is shown attached to sliding frame plate 30-a and 30-b.

As is well known in the art, mold modules 50,52 carried in master frames 46,48 respectively, include mold cavities 54.

Sliding frame plates 30 include any conventional attaching devices (none shown) for securing B-side master frames 48 thereon. Further, heating and cooling manifolds 58 are fixed to plates 30. Access through the plates 30 and plate receiving members 42 for use with ejectors 36 are provided; e.g., holes 60 shown in member 42-c on the hand side of FIG. 2. Other mechanisms which are necessary for the proper operation of press 10 are well known and are not shown in order to keep the drawings from being cluttered.

With respect to sliding frame plate 30-b shown on the left, latched mold modules 62,64 are carried in a second B-side master frame 48 and ready to replace modules 50,52 in press 10.

As noted above, sliding frame plates 30-a, 30-b are attached, side by side, by any convenient means so that they slide to and from members 42 as a unit and so that they disengage when normal opening and closing of press 10 occurs.

Plate receiving members 42 include top and bottom rails 70 having grooves 72 or other similar guidance system for receiving sliding frame plates 30.

FIGS. 3-7 illustrate the quick and easy method of changing out mold modules 50,52 with the apparatus of the present invention.

In FIG. 3, press 10 is opened and the last molded product (not shown) ejected. The water system (not shown) to A-side modules in master frame 46 is deactivated and water therein is vacuumed out.

FIG. 4 shows press 10 closing as indicated by arrow 76 but not going into a clamp mode; i.e., cooperating latches 78, shown in phantom in both master frames 46,48 are not engaged.

Figure 5:
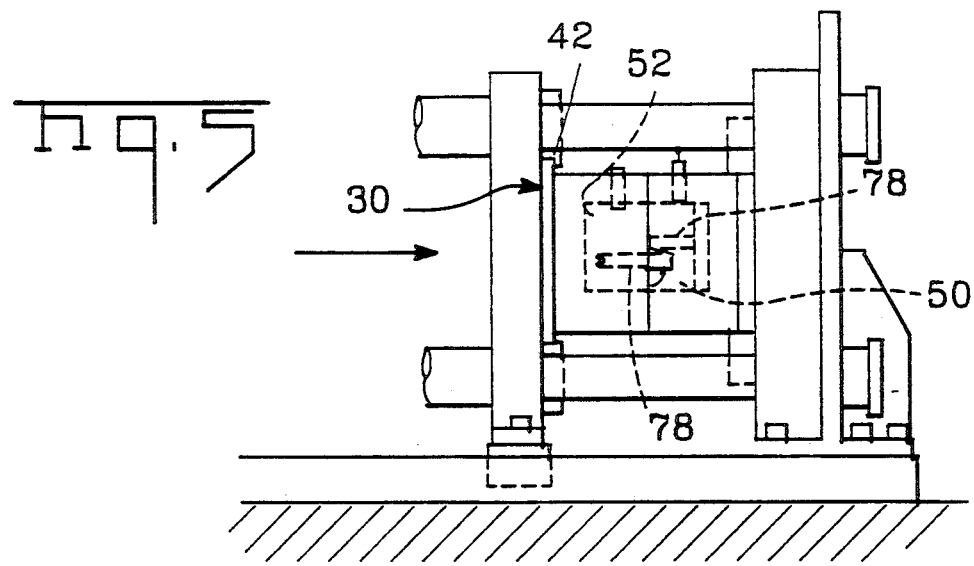

Further closing of press 10 as shown in FIG. 5 causes latches 78 to become fully engaged.

Figure 6:
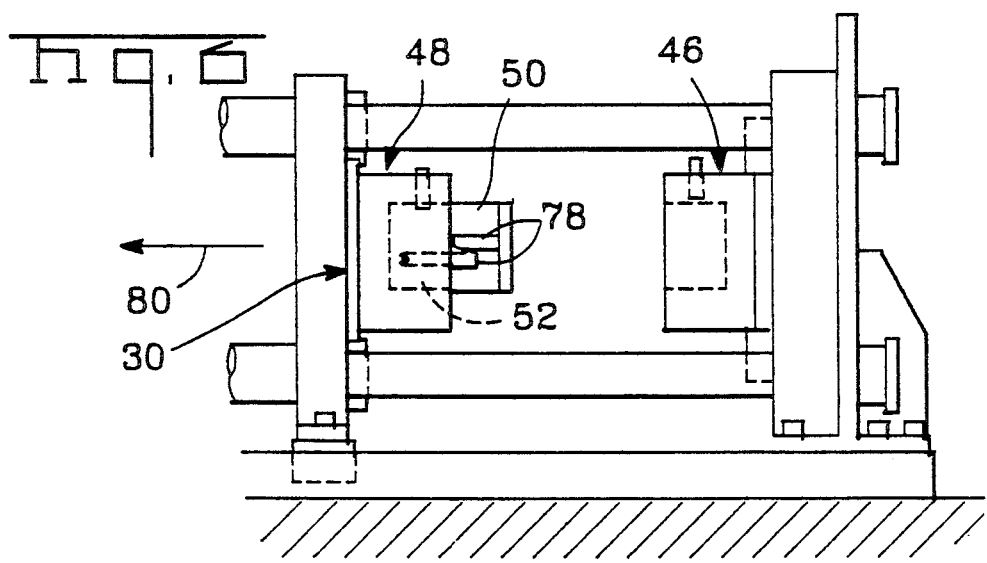

After mechanisms (not shown) securing mold modules 50 in A-side master frame 46 are released, press 10 is open as indicated by arrow 80 in FIG. 6. Both modules 50,52, latched together, are supported and carried by the B-side master frame attached to sliding frame plate 30-*a*. The water system (not shown) to the B-side module in master frame 48 is de-activated and water therein is vacuumed out.

Figure 7:
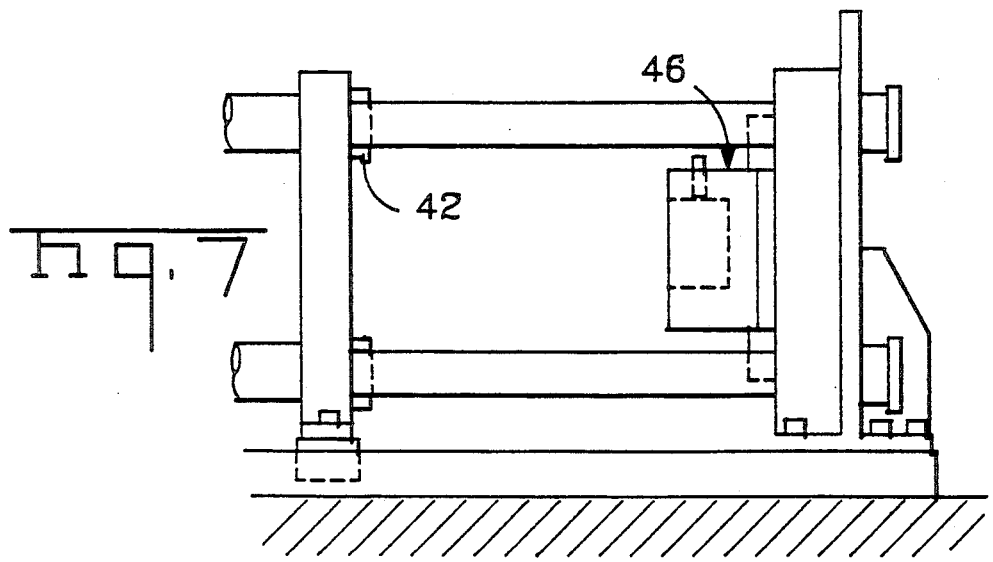

FIG. 7 indicates that frame plate 30-*a* has been de-clamped and slid out of plate receiving member 42-*b* and into member 42-*c* (not shown). Simultaneously, frame plate 30-*b* moves into plate receiving member 42-*b* from member 42-*a* and is clamped thereto. The next steps, not shown, include closing the press 10, to seat module 64 into A-side master frame 46 wherein it is clamped, activating the water system to climatize module 64, activating the water system to climatize B-side module 62 in master frame 48 on plate 30-*b* and then beginning a new production cycle.

Next, or even concurrently, mold modules 50,52 can be ejected from B-side master frame 48 on plate 30-*a* (now in plate receiving member 42-*c*) for replacement with other modules (not shown) in preparation for the next production run.

The foregoing module change-out sequence has highlighted those steps involving the inventive apparatus disclosed above while some detail not relating to the present invention has been omitted as those skilled in the art will appreciate. Further, the sequence has been described with two sliding frame plates 30 and three plate receiving members 42. Obviously, a press 10 may be equipped with one frame plate 30 and two members 42 and similar positive results obtained using the same method.

What has been set forth in detail in the preceding paragraphs is a description of apparatus which substantially speeds up the time required to change-out mold modules in a molding press. The apparatus includes sliding frame plates on which are mounted B-side master frames and associated mold modules. Further included are three plate receiving members located across the width of the press with one on each side of the member fixed to the movable platen. Other equipment includes an activator for sliding the frame plates between adjacent plate receiving members and ejectors for ejecting mold modules from the B-side master frame that has been taken out of service.

The disclosed method includes the steps of locking the mold modules in the stationary A-side master frame to the module in the movable B-side master frame, withdrawing the B-side master frame along with the locked together mold modules and then sliding the frame plate, to which the B-side master frame is attached, to a plate receiving member on one side or the other of the center plate receiving member. Concurrently, a sliding frame plate having new or different mold modules can be moved into position in the press for use therein with very little preparatory work required.

I claim:

1. Apparatus for use in a molding press, said apparatus comprising:
   first and second plate receiving means with said first plate receiving means mounted on a movable platen and said second plate receiving means positioned to one side of and in alignment with said first plate receiving means;
   a first plate slidably mounted on one of said plate receiving means;
   frame means mounted on said first plate for receiving removable mold modules;
   plate actuating means sliding said first plate between said first and second plate receiving means; and
   ejector means removing mold modules from said frame means mounted on said first plate.

2. The apparatus of claim 1 further including a third plate receiving means positioned to another side of and in alignment with said first plate receiving means and a second plate having frame means mounted thereon slidably mounted on another of said plate receiving means, said first and second plates being movable by said plate actuating means.

3. The apparatus of claim 2 wherein said first plate receiving means is movable normal to said second and third plate receiving means.

4. The apparatus of claim 3 wherein said first and second plates are engageable for movement between said plate receiving means and disengageable for movement normal to said second and third plate receiving means.

* * * * *